(12) United States Patent
Meijer et al.

(10) Patent No.: US 8,723,592 B2
(45) Date of Patent: May 13, 2014

(54) ADJUSTABLE BODY BIAS CIRCUIT

(75) Inventors: Rinze Meijer, Herkenbosch (NL); Cas Groot, Antwerp (BE); Gerard Villar Pique, Eindhoven (NL)

(73) Assignee: NXP B.V., Eindhoven (NL)

( * ) Notice: Subject to any disclaimer, the term of this patent is extended or adjusted under 35 U.S.C. 154(b) by 27 days.

(21) Appl. No.: 13/208,882

(22) Filed: Aug. 12, 2011

(65) Prior Publication Data

US 2013/0038382 A1    Feb. 14, 2013

(51) Int. Cl.
    *H03K 3/01*    (2006.01)
(52) U.S. Cl.
    USPC .......................................... 327/534; 327/535
(58) Field of Classification Search
    USPC ................................................ 327/534, 535
    See application file for complete search history.

(56) References Cited

U.S. PATENT DOCUMENTS

| | | | | |
|---|---|---|---|---|
| 5,422,591 | A * | 6/1995 | Rastegar et al. | 327/409 |
| 5,461,338 | A * | 10/1995 | Hirayama et al. | 327/534 |
| 5,838,047 | A * | 11/1998 | Yamauchi et al. | 257/372 |
| 6,166,577 | A * | 12/2000 | Mizuno et al. | 327/278 |
| 6,373,321 | B1 * | 4/2002 | Yamauchi et al. | 327/534 |
| 6,410,369 | B1 | 6/2002 | Flaker | |
| 6,512,410 | B2 * | 1/2003 | Jeong | 327/534 |
| 6,774,706 | B2 * | 8/2004 | Miyazaki et al. | 327/534 |
| 6,842,045 | B2 * | 1/2005 | Shimazaki et al. | 326/95 |
| 6,867,637 | B2 * | 3/2005 | Miyazaki et al. | 327/534 |
| 7,002,397 | B2 * | 2/2006 | Kubo et al. | 327/534 |
| 7,106,128 | B2 * | 9/2006 | Tschanz et al. | 327/534 |
| 7,453,311 | B1 * | 11/2008 | Hart et al. | 327/534 |
| 7,612,604 | B2 * | 11/2009 | Miyazaki et al. | 327/534 |
| 7,759,960 | B2 * | 7/2010 | Gattiker et al. | 324/750.05 |
| 7,816,742 | B1 * | 10/2010 | Koniaris et al. | 257/371 |
| 8,035,134 | B2 * | 10/2011 | Sumita | 257/207 |
| 2005/0134361 | A1 * | 6/2005 | Tschanz et al. | 327/534 |
| 2006/0066388 | A1 * | 3/2006 | Tschanz et al. | 327/534 |
| 2010/0079200 | A1 | 4/2010 | Xiang et al. | |

FOREIGN PATENT DOCUMENTS

WO    2010/052607 A1    5/2010

OTHER PUBLICATIONS

"Miyazaki, et al., ""An Autonomous Decentralized Low-PowerSystem with Adaptive-Universal Control for aChip Multi-Processor,""2003 IEEE International Solid-State Circuits Conference, Feb. 2003".
M.Meijer, "Body Bias Tuning in Modern Digital Integrated Circuit Designs—Literature Survey," NXP Technical Note TN2008-00302, Dec. 2008.
M.Meijer et.al, "A Forward Body Bias Generator for Digital CMOS Circuits with Supply Voltage Scaling," Proc. of ISCAS, Paris, Jun. 2010.

(Continued)

*Primary Examiner* — Thomas J Hiltunen (57) ABSTRACT

Body biasing circuit and methods are implemented in a variety of different instances. One such instance involves placing, a first well of a first body bias island and a second well of a second body bias island in a first bias mode by controlling switches of a body bias switch circuit. The biasing is one of a reverse body bias, a nominal body bias and a forward body bias. The second well is also biased according to one of a reverse body bias, a nominal body bias and a forward body bias. In response to the bias-mode input, the first well of the first body bias island and the second well of the second body bias island are each placed in a second bias mode by controlling switches of the body bias switch circuit. The bias of the first well and second well can be changed.

21 Claims, 5 Drawing Sheets

(56) References Cited

OTHER PUBLICATIONS

"Design and Physical Layout for a Multiplexor Array", IBM Technical Disclosure Bulletin, International Business Machines Corp. (Thornwood), US, vol. 37, No. 9, (Sep. 1, 1994), pp. 429-431, XP000473465, ISSN: 0018-8689.

Neau et al, "Optimal body selection for leakage improvement and process compensation over different technology generations", Proceedings of the 2003 International Symposium on Low Power Electronics and Design. ISLPED'03. Seoul, Korea, Aug. 25-27, 2003, New York, NY ACM, US, Aug. 25, 2003, pp. 116-121, XP010658598, ISBN: 978-1-58113-682-1.

Extended European search report, pursuant to Rule 62 EPC for Application No. 12177777.5—1959, Patent No. 2/557,479.

* cited by examiner

ADJUSTABLE BODY BIAS CIRCUIT

The often competing goals of high-performing and low-power design solutions can require complex architectural and circuit optimizations to the circuit design. Power and performance tradeoffs can require difficult design choices. Body biasing (BB) of semiconductor circuits facilitates tuning functionality, which can improve circuit parameters such as speed, power consumption or leakage. BB can also be used for compensating process-dependent performance spread by tuning after the integrated chip (IC) has been manufactured.

There are tradeoffs to body biasing depending upon the bias that is applied. Forward body biasing (FBB) will generally increase the performance of digital circuits at a penalty of increased leakage. FBB can extend the scaling limit of bulk-CMOS (complementary metal-oxide-semiconductor) due to improved short-channel effects. Reverse body biasing (RBB) will generally reduce the leakage power at the cost of a lower circuit speed. RBB offers higher leakage savings for a given performance penalty than non-minimum channel length transistors, reduced VDD or the stack effect in 70 nm CMOS.

While BB can be an attractive silicon tuning technique for achieving better design specifications and increased circuit robustness in modern bulk CMOS technologies, complex integrated circuits can include multiple different circuit portions, each portion having different tuning requirements. Moreover, the desired performance characteristics of a circuit can change during use of the circuit.

Various example embodiments of the present disclosure are directed to body biasing solutions, and to addressing various challenges, including those discussed above.

According to an example embodiment of the present disclosure, two body bias islands (BBIs), each containing at least one respective well, are body biased according to a first mode. The body biasing is then changed to accommodate a second mode. The body biasing can be provided from a body biasing voltage source (e.g., forward voltage supply, reverse voltage supply or nominal voltage sources), and in at least one of the modes, the voltage source can be shared between the two wells.

Embodiments of the present disclosure are directed toward a circuit-based apparatus that includes a first body bias island that is configured to allow a body bias to be applied to at least a first well. A second body bias island is configured to provide body bias to at least a second well.

A body bias switch circuit is configured and arranged to operate in different modes in response to a bias-mode input. The different modes involve control of switches connected to the first well and the second well. A first mode places both the first well and the second well into a first bias condition that includes, for each of the first and second wells, one of a reverse body bias, a nominal body bias and a forward body bias. A second mode places the first well and the second well into a second bias condition that includes, for the first well, a different one of a reverse body bias, a nominal body bias and a forward body bias.

According to other embodiments of the present disclosure, a method includes placing, in response to a bias-mode input, a first well of a first body bias island and a second well of a second body bias island in a first bias mode by controlling switches of a body bias switch circuit.

The first well is biased using one of a reverse body bias, a nominal body bias and a forward body bias. The second well is biased using one of a reverse body bias, a nominal body bias and a forward body bias. In response to the bias-mode input, the first well of the first body bias island and the second well of the second body bias island are placed in a second bias mode by controlling switches of the body bias switch circuit. The second bias mode involves changing the body bias of the first well using another of a reverse body bias, a nominal body bias and a forward body bias and controlling the body bias the second well.

Various embodiments of the present disclosure are directed toward a body bias switch circuit configured and arranged to operate in different modes in response to a bias-mode input. The different modes involve control of switches connected to a first well in a first body bias island and a second well in a second body bias island. A first mode places each of the first well and the second well into a first bias condition that includes, for each of the first and second wells, one of a reverse body bias, a nominal body bias and a forward body bias. A second mode places each of the first well and the second well into a second bias condition that includes, for the first well, a different one of a reverse body bias, a nominal body bias and a forward body bias.

The above discussion is not intended to describe each embodiment or every implementation of the present disclosure. The figures and following description also exemplify various embodiments.

Various example embodiments may be more completely understood in consideration of the following detailed description in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the disclosure is intended to cover all modifications, equivalents, and alternatives falling within the scope of the disclosure, including aspects defined in the claims.

The present disclosure is believed to be applicable to a variety of different types of circuits, devices and systems for and/or involving body biasing of circuit components, including but not necessarily limited to N-wells and/or P-wells, to improve various functional aspects of circuit components located in the circuit components. While the present disclosure is not necessarily limited in this context, various aspects of the disclosure may be appreciated through a discussion of related examples.

While aspects of the present disclosure are directed toward conventional bulk-CMOS technology with N-wells or P-wells, the disclosure is not necessarily so limited. For instance, the architectural concepts and related methodology discussed herein can be used in connection with silicon-on-insulator- (SOI) CMOS technology or other technologies where there might not be an N-well or P-well. For instance, a SOI-CMOS device can use partially-depleted SOI technology and have a transistor body. Body biasing can be applied to such an SOI device by contacting the bodies of individual transistors through well contacts. Other technologies include double-, multi- or FinFet technologies, where there are no N-wells, P-wells or contacts to the transistor body. Instead, body biasing can be done by using one of the transistor gates for $V_{th}$ (threshold voltage) modulation while the other gate is used for the normal signaling.

Body biasing (BB) is a technique that enables the adaptation of the threshold voltages of MOS devices after the integrated circuit has been manufactured. For traditional CMOS devices, control is provided by changing the N-well and, or P-well voltage potentials, the voltage between the device's body and source, e.g., VBS. The dependency between VBS and the NMOS transistor threshold voltage $V_{th}$ is:

$$V_{th} = V_{th0} + \gamma(\sqrt{2\phi_F - V_{BS}} - \sqrt{2\phi_F})$$

where $V_{th0}$ is the technology-dependent threshold voltage, $\gamma$ is the body factor or body coefficient, and $2\phi_F$ is the surface potential at strong inversion. The relationship between $V_{BS}$ and $V_{th}$ is non-linear. Moreover, the value of $\gamma$ determines the sensitivity of BB for $V_{th}$ control. As an example, consider the case of an NMOS device. The $V_{th}$ increases when the body-to-source potential ($V_{pwell} = V_{BS}$ in CMOS circuits) is negatively biased. This is referred to as reverse body biasing (RBB). Alternatively, the $V_{th}$ decreases when the body-to-source potential is positively biased. This is referred to as forward body biasing (FBB). The same holds for PMOS devices, however, the voltage potential is of opposite polarity ($V_{nwell} = V_{DD} - V_{BS}$ in CMOS circuits).

Thus, FBB reduces the threshold voltage ($V_{th}$) of the transistors, thereby increasing on-current, and in its turn, circuit speed. Unfortunately, transistor leakage is also increased under FBB as a result of the reduced $V_{th}$. This is not as large of an issue where the circuit is actively switching states because the switching/dynamic power often becomes the largest portion of the total power consumption in the circuit under this condition.

RBB lowers the NMOS transistor body voltage as compared to its source voltage, and/or raises the PMOS transistor body voltage as compared to its source voltage. In this way, RBB increases the $V_{th}$ of transistors, and thus reduces leakage; however, this advantage generally results in a slower switching speed, making it undesirable for active high-speed circuits. RBB can therefore achieve significant power reductions when applied in standby-mode operation and its potential is further exploited when used in combination with power supply voltage scaling.

Aspects of the present disclosure recognize that circuits/chips can operate according to a number of example power modes and that these power modes can be linked to body biasing. A high-performance/active mode includes an optimization of BB for speed (e.g., utilizing FBB), a normal mode may optimize for a combination of speed and leakage (e.g., utilizing nominal body bias (NBB)), and a standby/low-leakage mode may optimize for leakage (e.g., utilizing RBB). Specific embodiments are directed toward modes that include a selective application of BB so that each BB state is not uniformly applied to the whole circuit. For instance, FBB can be applied to a portion (domain) of the circuit that contains speed-critical circuit parts while RBB can be applied to another domain that does not contain speed-critical circuit parts.

Body biasing requires voltage generation for N-well and P-well voltages. The requirements of a FBB voltage generator are generally different than the requirements of a RBB voltage generator. An example FBB generator can be designed to be capable of sourcing/sinking large well currents due to forward biased junction diodes (mA-range), providing high slew rate of the well voltage transition (e.g., 100-500 mV/us), and providing low-power consumption (e.g., up to 0.5 mA active current may be acceptable). RBB generator can be designed to be capable of sourcing/sinking small well currents due to band-to-band tunneling currents (uA-range), providing modest slew rate of the well voltage transition (i.e., up to 10 mV/us), and providing low-power consumption (i.e., up to 500 nA active current may be acceptable). FBB and RBB generators can therefore be designed as separate circuits.

Aspects of the present disclosure are directed toward a BB architecture that supports the coherent use of different BB within the same chip at the same time at different locations, or at the same location at different times. The architecture facilitates the use of optimized (and a minimum amount of) FBB and RBB generator circuits, which can be beneficial for chip specifications over different power modes of operation.

Embodiments of the present disclosure are related to one or more of the following features: dynamic power-performance management with body biasing; increased chip speed with FBB at minimum power by speeding-up speed-critical parts only; reduced chip leakage with RBB for the same chip having the increased chip speed with FBB; flexibility in the design of logic and/or memory and/or analog intellectual property cores (IP blocks); full integration; a solution without the need for external components; a scalable solution to apply to different circuit regions within a given system chip; and/or a scalable solution to apply in system chips of different complexity.

Various implementations of the present disclosure relate to an ensemble of building blocks that provide for the coherent use of different body biasing voltages throughout an integrated circuit chip. Some of the descriptions herein presume the existence of a chip design that has two voltage domains operating at the same power supply voltage but that can be set to different body biasing. These voltage domains are referred to as Body Bias Island (BBI) 1, and BBI 2. Without loss of generality, FBB, NBB, or RBB can be selectively applied at different moments in time for BBI 1, while BBI 2 makes use of NBB or RBB. Consistent with various embodiments, both islands have their own triple-well shielding, and do not share the N-well and P-well.

Embodiments of the present disclosure include a circuit designed to operate in different modes in response to a bias-mode input. The modes correspond to different bias settings for the multiple BBIs. For instance, a first mode can involve placing a first BBI in a FBB state and a second BBI in a NBB state. This mode accounts for situations where the first BBI includes high-speed components that benefit from the FBB state, while the second BBI includes components with less stringent speed requirements. Components on both BBIs can operate at their top operating speed. Thus, the first mode can represent an active mode. A second mode can involve placing the first BBI in a RBB state and the second BBI also in a RBB state. This second mode reduces leakage current for both BBIs, which can result in significant power savings when components on the BBIs are inactive. Thus, this second mode can represent an inactive mode or a power savings mode.

Consistent with other embodiments of the present disclosure, one or more additional bias modes can be implemented. For instance, an intermediate mode can place two BBIs in an NBB state. This allows components on both BBIs to operate at an intermediate speed. A device can therefore change bias modes in response to changing processing demands. As a non-limiting example, a smart phone could operate in a first high-power mode (utilizing FBB and NBB) during an active call (or Internet connection) and/or while performing video processing of other processing intensive functions. The same smart phone could operate in an intermediate mode (utilizing NBB) when there is not an active call, but a user is using other functions of the smart phone (e.g., running an application or accessing various features of the smart phone). When the smart phone is not being actively used, it could operate in power save mode (utilizing RBB).

Various aspects of the present disclosure are directed toward circuits that facilitate the use of a common bias voltage supply circuit to provide a bias voltage to multiple BBIs while also providing the multiple bias modes discussed herein. A BBI switch can be used to selectively link a bias voltage to one or more BBIs. One or more bias voltage supply circuits can be configured with isolation/tri-state circuitry to allow selective use of produced bias voltages. Examples of these and other aspects are discussed in more detail herein.

Figure 1:
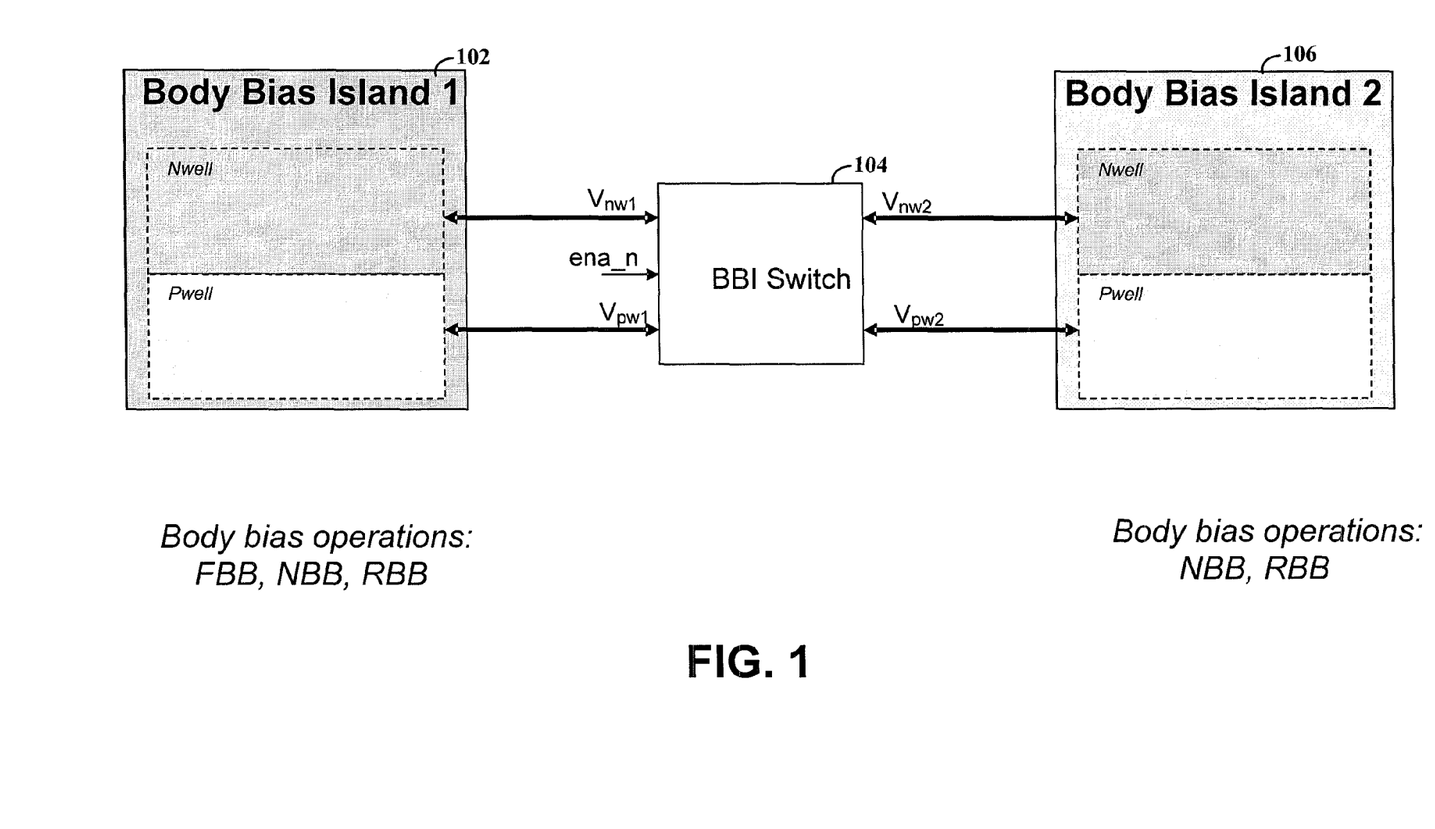
FIG. 1 depicts a system diagram including two body bias islands (BBIs) and a BBI switch, consistent with embodiments of the present disclosure.

Turning now to the figures, FIG. 1 depicts a system diagram including two BBIs and a BBI switch, consistent with embodiments of the present disclosure. BBIs 102 and 106 include both N-wells and P-wells. The BBIs can also include a deep N-well (DNW) to collect the charge released in the substrate and to prevent the P-wells from being shorted to one another. BBI switch 104 switch provides electrical connectivity between the N-wells and/or P-wells of BBI 1 and BBI 2 in response to enable signals (e.g., ena_n). BBI switch 104 can also isolate the N-wells and/or P-Wells of BBI 1 and BBI 2 from one another in response to the enable signals. This allows for BBIs 102 and 104 to operate either at the same body biasing or at different body biasing conditions.

Aspects of the present disclosure are directed toward embodiments in which one or more common bias voltage generators (whether an FBB, RBB or NBB generator) can be used for each of the BBIs 102 and 106. When the BBI switch 104 is active, a voltage generator can provide a bias voltage to both BBIs 102 and 106. For instance, a RBB bias voltage generator can be connected to the N-well (and/or P-well) of BBI 106. When BBI switch 104 is active, the output of the RBB bias voltage generator is also provided to the N-well (and/or P-well) of BBI 102. Thus, a single RBB bias voltage generator can be used to place both BBIs 102 and 106 into an RBB state. When the BBI switch is inactive, however, different body biases can be provided to the BBIs 102 and 106 because they are effectively isolated from each other.

Consistent with certain embodiments of the present disclosure, the BBI switch 104's enable signal is provided to facilitate the use of one or more bias modes. A first bias mode includes a shared bias voltage between BBIs 102 and 106, whereas a second bias mode includes two different bias voltages for BBIs 102 and 106. As a non-limiting example, the first bias mode can be implemented with a RBB state for both BBIs 102 and 106, while a second bias mode can be implemented with a FBB state for one of the BBIs, and a NBB state for the other of the BBIs.

Figure 2:
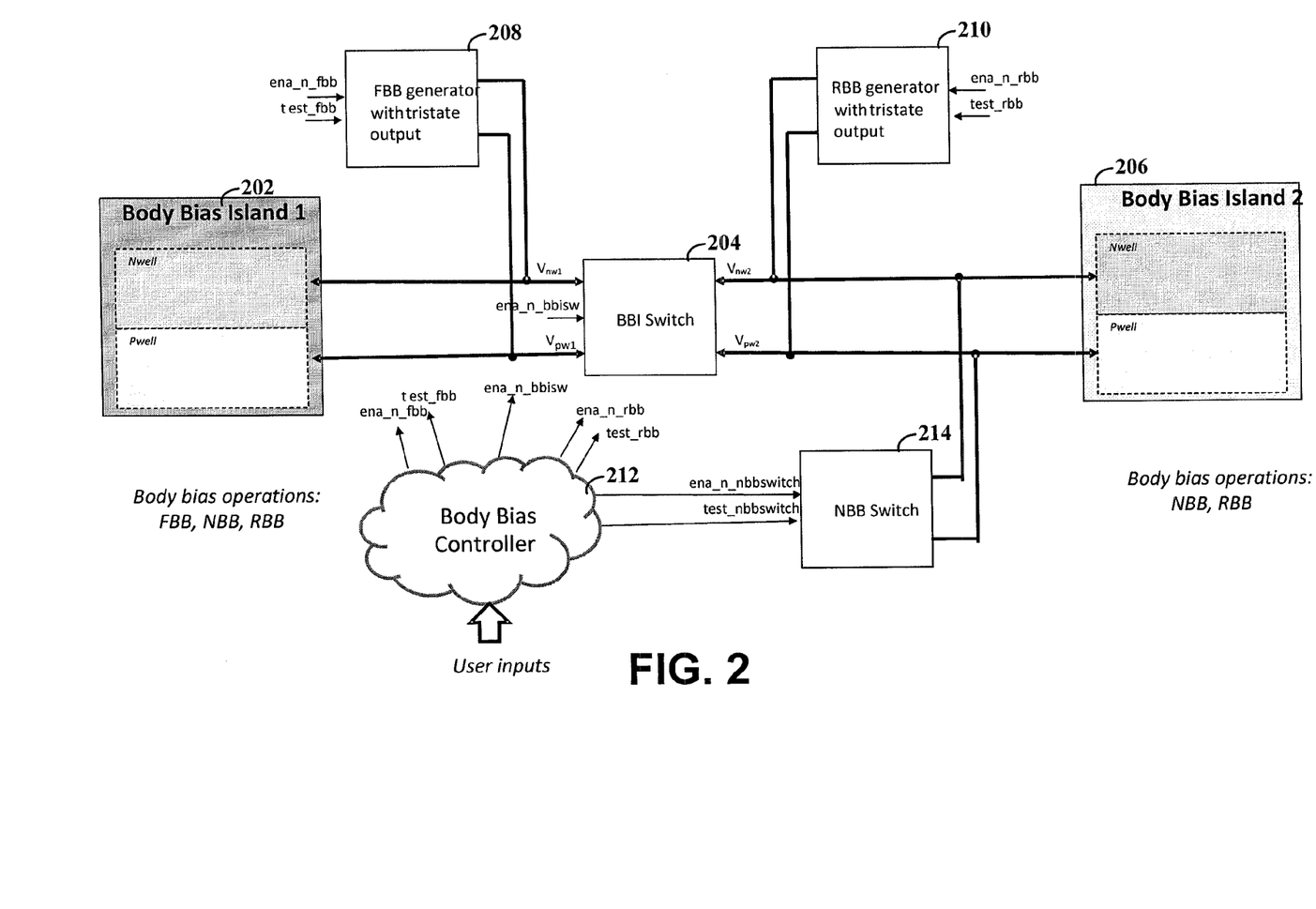
FIG. 2 depicts a system diagram for providing multiple bias voltages to multiple BBIs, consistent with embodiments of the present disclosure.

FIG. 2 depicts a system diagram for providing multiple bias voltages to multiple BBIs, consistent with embodiments of the present disclosure. The BBI switch 204 can isolate or connect the N-wells and P-wells of BBIs 202 and 206 from one another in response to an enable signal (e.g., ena_n_b-bisw). A FBB bias voltage generator 208 is connected to the N-well and P-well of BBI 202. A RBB bias voltage generator 210 is connected to the N-well and P-well of BBI 206. NBB switch 214 can isolate or connect the N-well and P-well of BBI 206 to a nominal bias voltage (e.g., $V_{DD}$ for the N-well and $V_{SS}$ for the P-well). Body bias controller 212 provides control signals for the switches and bias voltage generators. Bias voltage generators 208 and 210 include isolation/tri-state outputs that allow other bias voltages to be provided to the BBIs (and their N-well/P-well) for which they are directly connected. For instance, when BBI switch 204 is active, at least one of the two bias voltage generators 208 and 210 is isolated from the BBIs 202 and 206. If both the NBB switch 214 and the BBI switch 204 are active, then both of the bias voltage bias voltage generators 208 and 210 are isolated.

The system depicted in FIG. 2 allows for the use of multiple different bias modes that can be dynamically adjusted according to the demands placed upon the system. Table 1 shows a possible break down of several different bias modes that can be achieved by controlling the enable signals provided from BB controller 212 to the various BBI switches and bias voltage generators.

TABLE 1

| Body Bias Mode | BBI 1 Biasing | BBI 2 Biasing |
| --- | --- | --- |
| High-Performance | FBB | NBB |
| Normal-Performance | NBB | NBB |
| Low-Leakage | RBB | RBB |
| Standby-1 | RBB | RBB |
| Standby-2 | Unpowered | Unpowered |

The particular states for the components of FIG. 2 are described in Table 2.

TABLE 2

| | BBI 1 Biasing | | BBI 2 Biasing | |
| --- | --- | --- | --- | --- |
| Body Bias Mode | FBB | BBI Switch | NBB | RBB |
| High-Performance | ON | OFF | ON | OFF |
| Normal-Performance | OFF | ON | ON | OFF |
| Low-leakage | OFF | ON | OFF | ON |
| Standby-1 | OFF | ON | OFF | ON |
| Standby-2 | OFF | ON or OFF (Do Not Care) | OFF | OFF |

The first and second BBI can operate in respective power domains at a given $V_{DD}$, while power gating can be used to turn off $V_{DD}$. In certain embodiments, a third domain operates as a voltage domain that is always on. In this example, the first and second domains exploit BB. The configuration corresponding to Table 1 does not apply FBB to BBI 2, even in high-performance mode. This can be particularly useful when BBI 1 contains speed-critical circuit components, while BBI 2 does not. Applying FBB to BBI 2 would increase leakage overhead while any potential speed improvement would not (or at least not fully) benefit the circuit components of BBI 2.

Consistent with embodiments of the present disclosure, an integrated circuit can be implemented that has multiple body bias islands. Each island can be put in a certain bias condition depending on application needs. The proposed body bias architecture discussed herein allow for a reduced number of body bias voltage generators on the integrated circuit through utilization of BBI switches and the recognition that islands with same speed/power characteristics can have same body biasing for a given mode of operation and that such characteristics can be application dependent.

An integrated circuit could also have circuit portion(s) that have a non-programmable body bias (e.g., are only nominally or forward body biased). This could be the case in a multi-power domain chip, e.g., an always-on domain could be configured without a programmable body bias.

According to the example bias modes of Tables 1 and 2, the FBB bias voltage generator 208 isolates whenever BBI switch 204 is active. Thus, the FBB bias voltage generator 208 can be designed to provide sufficient drive capability to bias the N-well and P-well of BBI 1; rather than providing sufficient drive capacity to both BBI 1 and BBI 2.

The BB Controller 212 can be implemented using discrete logic circuits, software-programmable processors and/or using a look-up table approach. Tables 1 and 2 show a basic implementation of the functionality of BB Controller 212, however, the disclosure is not necessarily so limited. For instance, BB Controller 212 could be configured and arranged to set the body bias voltage for each island to different levels. This voltage control could be implemented dynamically and/or adaptively in response to circuit conditions.

BB Controller 212 can be configured to operate in several different manners and in response to various different inputs. For instance, BB Controller 212 can be configured using an interface that is accessible to inputs from, but not limited to, software applications, user inputs and hardware control signals. For instance, software applications can indicate a need to access certain functional circuits and/or set power-status/modes. An application programming interface (API) can be provided so that different software programs can initiate different modes. In another instance, BB Controller 212 can be accessed by writing to a register with data indicating the desired mode. In still other embodiments, BB Controller 212 can receive a signal that indicates a change in operational speed (e.g., a signal that represents a change to clock speed of one or more circuits). BB Controller 212 could also respond directly to user input (e.g., a user pressing a button to activate or deactivate the device or a portion thereof). Various other interfaces and inputs can also be used and BB Controller 212 can be configured to use the different possible inputs alone or in combination.

The above examples are not limiting and various other bias modes are possible. Moreover, the specific configuration of FIG. 2 can be modified to provide different/additional functionality. For instance, an additional NBB switch directly connected to the BBI 1 can allow for a bias mode for which BBI 1 is in a NBB state and BBI 2 is not (e.g., BBI 2 could be in a RBB state). In other instances, additional BBIs can be added. Using additional BBI switches, these additional BBIs can share one or more of the bias voltage generators in certain bias modes and yet have BB independence in other bias modes.

Figure 3:
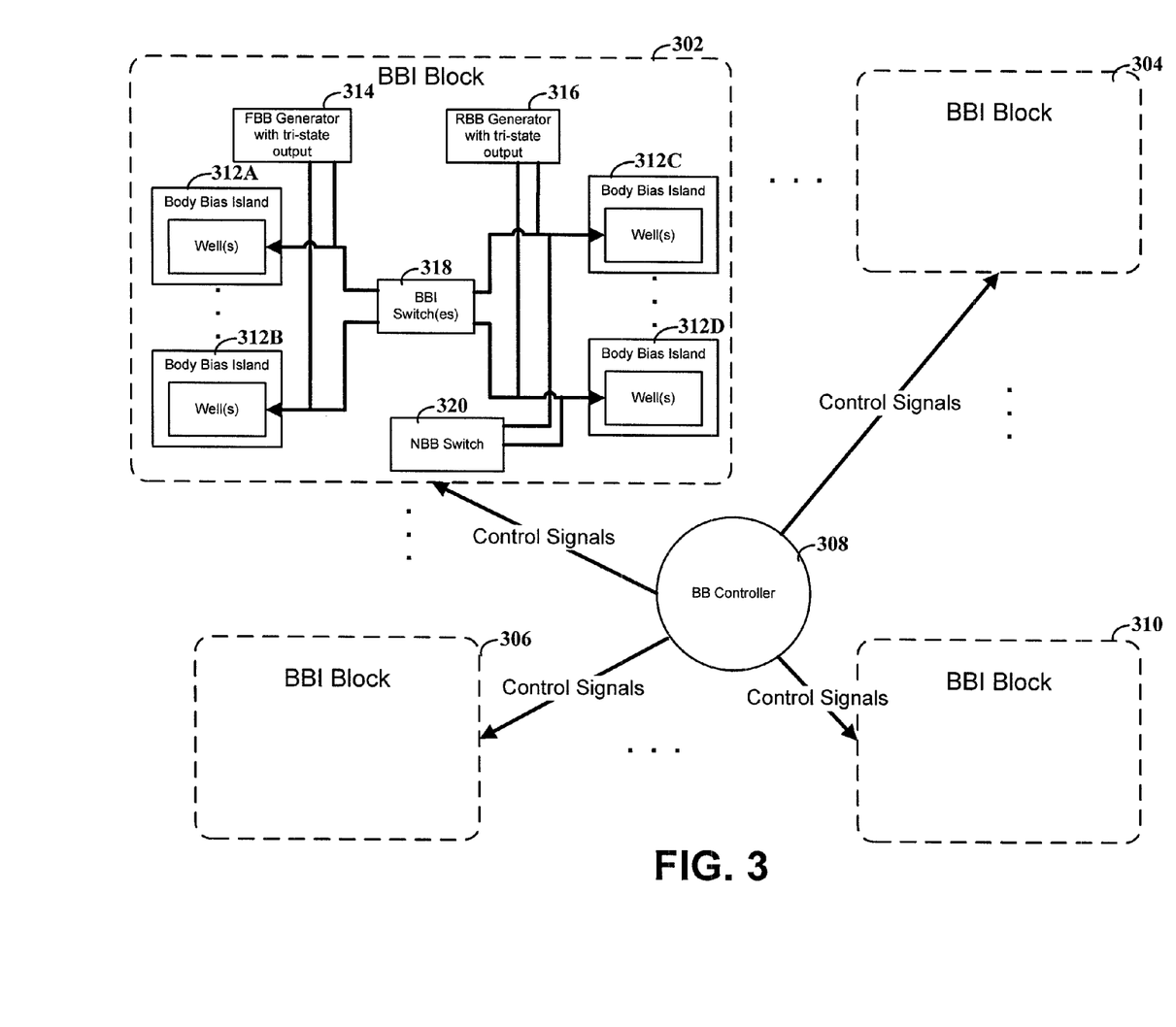
FIG. 3 depicts a system diagram showing BB scalability of multiple BBIs, consistent with embodiments of the present disclosure.

FIG. 3 depicts a system diagram showing BB scalability of multiple BBIs, consistent with embodiments of the present disclosure. BBI block 302 includes multiple BBIs 312. BBIs 312 are connected to FBB voltage generator 314, RBB voltage generator 316, BBI switch circuit 318 and NBB switch circuit 320 in much the same manner as discussed in connection with FIG. 2. The scalability and flexibility of the system, however, is exhibited by the ability to design an architecture that has many different BBIs.

Consistent with embodiments of the present disclosure, the system can be configured so that each island can be configured to have a different body bias. In order to reduce the amount of BB voltage generators, multiple BBI switches can be used between the different islands. As two examples: for a 2-island case, there is one BBI switch, whereas for a 3-island case there can be 1-3 BBI switches (e.g., where 3 switches allow for a single switch between all combinations of two islands).

In a particular implementation, the FBB bias voltage generator 314 and the RBB bias voltage generator 316 can have separately-controllable tri-state circuits for the different BBIs 312. Similarly, both BBI switch circuit 318 and NBB switch circuit 320 can provide separately-controllable connections to/between respective BBIs 312. For example, BBI 312A can be linked to BBI 312C when a first switch is active. BBI 312B can also be linked with BBI 312D when a second switch is active; however, this second switch can be controlled independently from the first switch.

The independent switch control allows for sets of BBIs 312 to be linked and controlled, consistent with respective and different BB modes (e.g., according to Table 1). Thus, a first set of BBIs 312 can be in an active mode that has the following properties: a corresponding output of FBB bias voltage generator 314 is enabled, a corresponding output of RBB bias voltage generator 316 is disabled/isolated, a corresponding switch of BBI switch circuit 318 is disabled and a corresponding switch of NBB switch circuit 320 is enabled. At the same time, a second set of BBIs 312 can be in a standby mode that has the following properties: a corresponding output of FBB bias voltage generator 314 is disabled, a corresponding output of RBB bias voltage generator 316 is enabled, a corresponding switch of BBI switch circuit 318 is enabled and a corresponding switch of NBB switch circuit 320 is disabled.

In various embodiments of the present disclosure, BBI switch circuit 318 is configured and arranged to provide routing options between BBIs 312. For instance, BBI 312A can be linked to BBI 312C or to BBI 312D. This allows for more flexibility in how bias modes are implemented. For instance, BBI 312C and BBI 312D can contain circuits designed to perform different functions. This can lead to certain situations where processing is required by BBI 312A and BBI 312C, while other situations require processing by BBI 312A and BBI 312D. BBI switch configurability can account for both of these situations, while maintaining the unused BBI switches (e.g., BBI 312B and the other of either BBI 312C and BBI 312D) in a standby-mode.

FIG. 3 also depicts optional embodiments in which there are multiple BBI blocks (302, 304, 306 and 310). The size and complexity of integrated circuit chips continue to grow. This can lead to difficulties with routing bias voltages across the entire chip. Moreover, different circuit components may be optimally biased at different voltages. Accordingly, it can be advantageous to provide localized generation of bias voltages. The multiple BBI blocks each contain multiple BBIs connected to corresponding bias voltage generators and to corresponding switches.

BB controller 308 provides enable/control signals that determine the modes for the various BBIs by controlling the state of the bias voltage generators and switches. Although BB controller 308 is depicted as a centralized controller, BB controller 308 can be implemented using distributed control circuitry. Thus, portions of the control circuit can be co-located at or near each BBI block.

Figure 4:
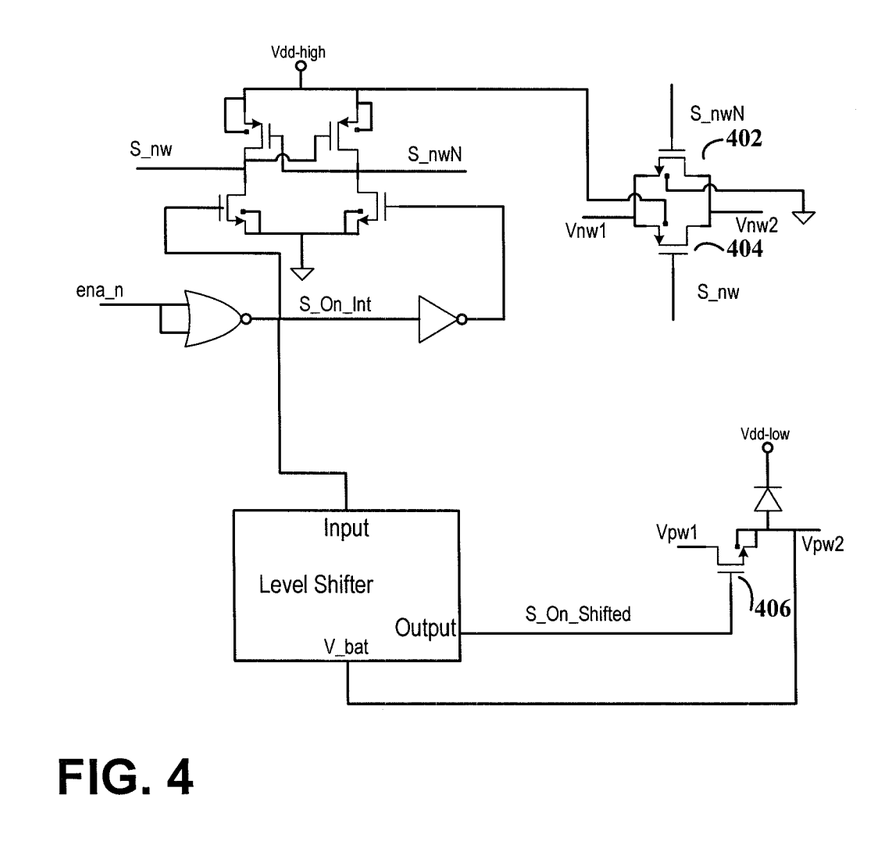
FIG. 4 depicts circuit components of a BBI switch, consistent with embodiments of the present disclosure.

FIG. 4 depicts circuit components of a BBI switch, consistent with embodiments of the present disclosure. The three MOS transistors 402, 404 and 406 provide the switching function. When the MOS transistors are active, the N-wells (Vnw) and the P-wells (Vpw) of two different BBIs are connected to the same bias voltage. When the MOS transistors are inactive, the N-wells and P-wells of the two BBIs are isolated from each other. The ena_n signal controls the state of the MOS transistors. When the ena_n signal is active, the MOS transistors connect the wells of the BBIs. When the ena_n signal is inactive, the MOS transistors isolate the wells of the BBIs.

Consistent with embodiments of the present disclosure, transistors 402, 404 and 406 can be implemented as thick gate-oxide transistors. The control signals provided to the gates of the transistors can be set using a level shifter, which can shift the signal level (Vdd-high) to a lower signal level (Vdd-low). The particular values for the signals levels can be technology and application dependent (e.g., in certain CMOS applications, Vdd-low could be V and Vdd-high could be 3.3V).

The specific circuit depicted in FIG. 4 is not meant to be limiting. Variations on this circuit can be made to provide similar or additional functionality. For instance, additional routing circuitry can be added to respond to routing control signals. In this manner, the BBI switch can function to connect a first BBI well to a BBI well from any of multiple other BBIs.

Figure 5:
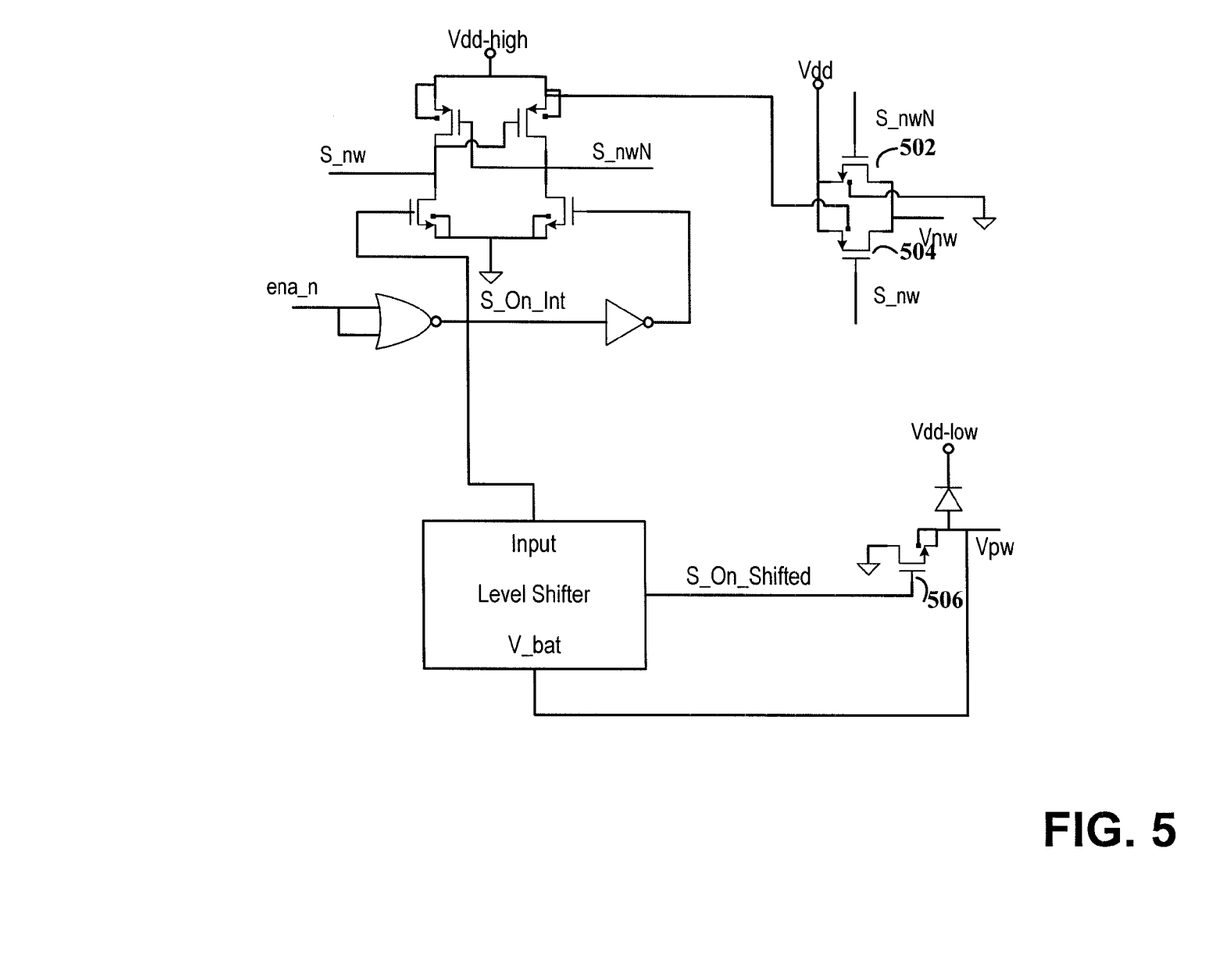
FIG. 5 depicts circuit components of a nominal body bias (NBB) switch, consistent with embodiments of the present disclosure.

FIG. 5 depicts circuit components of a NBB switch, consistent with embodiments of the present disclosure. The NBB switch provides the connectivity and isolation of the N-well to $V_{DD}$, and the P-well to $V_{SS}$. When NBB switch is enabled, the N-well is connected to $V_{DD}$ (through transistors 402 and 404) and the P-well is connected to $V_{SS}$ (through transistor 406). When NBB switch is not enabled, N-well is isolated from $V_{DD}$ and the P-well is isolated from $V_{SS}$. When the NBB switch is in isolation mode, either the FBB generator or RBB generator can provide the body bias to the circuit.

Consistent with various embodiments of the present disclosure, a test mode (through TEST_RBB signal) can be implemented. When the NBB switch is in test mode, the N-well and P-well are isolated from $V_{DD}$ and $V_{SS}$ to allow for testing of the RBB generator.

Aspects of the disclosure can be practiced with computer/processor-based system configurations other than those expressly described herein. The required structure for a variety of these systems and circuits would be apparent from the intended application and the above description.

It is to be understood that various terms and techniques are used by those knowledgeable in the art to describe communications, protocols, applications, implementations, mechanisms, etc. One such technique is the description of an implementation of a technique expressed in terms of functional features that can also be represented as algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting functional limitations as a function with possible implementation in hardware and/or software, such as in combinatorial logic circuitry. Thus, the use of functional language, formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions can be stored, on a non-transitory storage medium, for execution in a manner consistent with one or more of the methods of the present disclosure. The instructions can be used to cause a general-purpose or special-purpose processor that is programmed with the instructions to perform the steps of the methods. Alternatively, the steps might be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions. These instructions may be used to program a computer (or other electronic devices) to perform a process according to the present disclosure. Accordingly, the computer-readable medium includes any type of media/machine-readable medium suitable for storing electronic instructions.

Based upon the above discussion and illustrations, those skilled in the art will readily recognize that various modifications and changes may be made to the present disclosure without strictly following the exemplary embodiments and applications illustrated and described herein. For example, differing combinations of bias voltage generators, switches and related components are possible. Such modifications do not depart from the true spirit and scope of the present disclosure, including that set forth in the following claims. Furthermore, the term "example" as used throughout this document is by way of illustration, and not limitation.

What is claimed is:

1. A circuit-based apparatus comprising:
a first body bias island that is configured to provide body bias to at least a first well;
a second body bias island that is configured to provide body bias to at least a second well; and
a body bias switch circuit configured and arranged to operate in different modes in response to a bias-mode input, the body bias switch circuit including a switch having a first terminal coupled to the first well and a second terminal coupled to the second well, the different modes involving control of the different modes including:
a first mode that places each of the first well and the second well into a first bias condition that includes, for each of the first and second wells, one of a reverse body bias, a nominal body bias and a forward body bias;
a second mode that places each of the first well and the second well into a second bias condition that includes, for the first well, a different one of a reverse body bias, a nominal body bias and a forward body bias; and
a third mode that places the first well and the second well in a third bias condition that is different from the first and second bias conditions.

2. The apparatus of claim 1, wherein the body bias switch circuit is configured and arranged to:
in response to operating in the first mode, close the switch and thereby provide a same bias for both of the first and second wells; and
in response to operating in the second mode, open the switch and thereby allow the first well to be provided with a bias that is different than a bias provided to the second well.

3. The apparatus of claim 1, further including:
a forward body bias generation circuit coupled to the first well and configured and arranged to generate a forward bias voltage and provide the forward bias voltage to the first well; and isolate, in response to the bias-mode input;
a nominal body bias generation circuit coupled to the second well and configured and arranged to generate the nominal body bias and provide the nominal body bias to the second well; and
a reverse body bias generation circuit coupled to the second well and configured and arranged to generate the reverse body bias and provide the reverse body bias to the second well.

4. The apparatus of claim 3, further comprising a control circuit configured and arranged to disable two of the forward body bias generation circuit, the nominal body bias generation circuit, and the reverse bias generation circuit in response to the body bias switch circuit operating in the first mode.

5. The apparatus of claim 1, wherein body bias switch circuit is further configured and arranged to operate in the third mode and wherein the first mode places the first well and the second well in reverse body bias, the second mode places the first well in a nominal body bias and the second well in the forward body bias, and the third mode places the first well and the second well in nominal body bias.

6. The apparatus of claim 1, wherein the circuit-based apparatus includes one or more control circuits configured to generate the bias-mode input in response to a current operating speed for circuits on the first well and the second well.

7. The apparatus of claim 1, further including a third island that is configured to provide body bias to at least a third well and wherein the body bias switch circuit is further configured and arranged to connect the third well of the third island to each of the first well and the second well in response to the bias-mode input.

8. The apparatus of claim 1, wherein the first well is an N-well and the first island further includes a third well that is a P-well, and wherein the body bias switch circuit is further configured and arranged to operate with the first mode placing the third well in the first bias condition.

9. The apparatus of claim 1, further including a reverse body bias generation circuit configured and arranged to
   generate a reverse bias voltage;
   provide the reverse bias voltage to at least one of the first well and the second well; and
   isolate the reverse bias voltage from the at least one of the first well and the second well in response to the bias-mode input.

10. The apparatus of claim 1, further including additional body biasing islands, each having corresponding wells connected by another corresponding body bias switch circuit configured and arranged to operate in different modes.

11. The apparatus of claim 1, wherein the body bias switch circuit is configured and arranged to:
    in response to operating in the first mode, close the switch and thereby provide a same bias for both of the first and second wells and thereby place both of the first and second wells in the same one of a reverse body bias, a nominal body bias and a forward body bias; and
    in response to operating in the second mode, open the switch and thereby allow the first well to be provided with a bias that is different than a bias provided to the second well.

12. The apparatus of claim 1, wherein the first mode places the first well and the second well in reverse body bias, the second mode places the first well in a nominal body bias and the second well in the forward body bias.

13. A circuit-based apparatus comprising:
    a first body bias island that is configured to provide body bias to at least a first well;
    a second body bias island that is configured to provide body bias to at least a second well;
    a body bias switch circuit configured and arranged to operate in different modes in response to a bias-mode input, the body bias switch circuit including a switch having a first terminal coupled to the first well and a second terminal coupled to the second well the different modes involving control of the different modes including:
       a first mode that places each of the first well and the second well into a first bias condition that includes, for each of the first and second wells, one of a reverse body bias, a nominal body bias and a forward body bias; and
       a second mode that places each of the first well and the second well into a second bias condition that includes, for the first well, a different one of a reverse body bias, a nominal body bias and a forward body bias,
    wherein the first well includes circuit components operating at a first speed, the second well includes circuit components operating at a second speed that is slower than the first speed, and wherein the first bias condition places the first well in a forward bias condition and the second well in a nominal bias condition.

14. A method comprising:
    placing, in response to a bias-mode input, a first well of a first body bias island and a second well of a second body bias island in a first bias mode by
       controlling switches of a body bias switch circuit to
          bias the first well using a first one of a set of body biases including a reverse body bias, a nominal body bias and a forward body bias; and
          closing a first switch having a first input coupled to the first well and a second input coupled to the second well to bias the second well with the first one of the set of body biases; and
    placing, in response to the bias-mode input, the first well of the first body bias island and the second well of the second body bias island in a second bias mode by
       controlling switches of the body bias switch circuit to
          open the first switch; and
          bias the first well using one of the set of body biases and bias the second well using a different one of the set of body biases.

15. The method of claim 14, further including placing, in response to a bias-mode input, the first well of the first body bias island and a second well of a second body bias island in a third bias mode.

16. The method of claim 15, wherein the first bias mode is a high-performance mode, in which the first well is forward body biased and the second well is nominal body biased, the second bias mode is a normal power mode in which the first well is nominal body biased and the second well is nominal body biased, and the third bias mode is a low power mode in which the first well is reverse body biased and the second well is reverse body biased.

17. The method of claim 14, further including the step of enabling a tri-state on a forward body bias voltage generator circuit in response to the bias-mode input.

18. The method of claim 14, further including the step of enabling a tri-state on a reverse body bias voltage generator circuit in response to the bias-mode input.

19. The method of claim 14, further including the step of disabling a switch that connects a nominal body bias voltage to the second well in response to the bias-mode input.

20. A body bias switch circuit configured and arranged to operate in different modes in response to a bias-mode input, the different modes involving control of switches, each having a first terminal connected to a first well in a first body bias island and a second terminal connected to a second well in a second body bias island, and the different modes including
    a first mode that places of the first well and the second well into a first bias condition that includes, for each of the first and second wells, one of a reverse body bias, a nominal body bias and a forward body bias;
    a second mode that places each of the first well and the second well into a second bias condition that includes, for the first well, a different one of a reverse body bias, a nominal body bias and a forward body bias; and
    a third mode that places the first well and the second well in a third bias condition that is different from the first and second bias conditions.

21. The body bias switch circuit of claim 20, wherein the first bias condition provides a same bias for both of the first and second wells and the second bias condition provides one bias for the first well and a second, different bias for the second well.

* * * * *